United States Patent [19]

Zimmermann et al.

[11] Patent Number: 5,785,254
[45] Date of Patent: Jul. 28, 1998

[54] FUEL INJECTION VALVE

[75] Inventors: Georg Zimmermann; Horst Magenau, both of Gerlingen; Juergen Buehring; Gilbert Moersch, both of Stuttgart; Joerg Heyse, Markgroeningen; Harald Koenig, Renningen; Michael Klaski, Erdmannhausen, all of Germany

[73] Assignee: Robert Bosch GmbH, Stuttgart, Germany

[21] Appl. No.: 793,886

[22] PCT Filed: May 4, 1996

[86] PCT No.: PCT/DE96/00777

§ 371 Date: Mar. 12, 1997

§ 102(e) Date: Mar. 12, 1997

[87] PCT Pub. No.: WO97/05378

PCT Pub. Date: Feb. 13, 1997

[30] Foreign Application Priority Data

Jul. 28, 1995 [DE] Germany ............. 195 27 626.4

[51] Int. Cl.[6] .................................................. F02M 61/18
[52] U.S. Cl. .................. 239/490; 239/585.4; 239/900
[58] Field of Search ......................... 239/399, 474, 239/463, 490, 533.12, 585.4, 900

[56] References Cited

U.S. PATENT DOCUMENTS

| 3,128,048 | 4/1964 | Denure | 239/474 X |
|---|---|---|---|
| 3,915,623 | 10/1975 | Wormser | 239/399 X |
| 4,394,973 | 7/1983 | Sauer et al. | 239/490 X |
| 4,890,794 | 1/1990 | Imafuku et al. | 239/533.12 |
| 4,925,111 | 5/1990 | Foertsch et al. | 239/533.12 |

FOREIGN PATENT DOCUMENTS

| 2339125 | 2/1975 | Germany | 239/399 |
|---|---|---|---|
| 27 23 280 | 12/1997 | Germany . | |
| 419949 | 5/1934 | United Kingdom | 239/399 |

*Primary Examiner*—Kevin Weldon
*Attorney, Agent, or Firm*—Kenyon & Kenyon

[57] ABSTRACT

A fuel injection valve has downstream a valve seat (23), an injector plate (23), which is characterized by having a plurality of swirl-producing elements on the intake side, followed by at least one uninterrupted annular gap in the downstream direction. The swirl-producing elements are arranged in a turbine vane-shaped form by each individual element running mostly radially and being tilted in the peripheral direction and the elements being arranged behind one another in a circular shape. The annular gap (45) represents the spray geometry. With this arrangement the fuel can be finely atomized without additional power consumption. The breakup into minute droplets results in further reduction of the exhaust emissions of an internal combustion engine and in lower if fuel consumption. The fuel injection valve is especially well-suited for use in injection systems of mixture-compression externally ignited internal combustion engines.

10 Claims, 3 Drawing Sheets

FUEL INJECTION VALVE

FIELD OF THE INVENTION

The present invention relates to a fuel injection valve, and in particular to a fuel injection valve for a fuel injection system of a mixture-compressing externally ignited combustion engine.

BACKGROUND INFORMATION

It is known from German Offenlegungsschrift 2,723,280 to arrange, on a fuel injection valve, a fuel breakup element in the form of a flat thin disk having a plurality of narrow curved slots, in the downstream direction from a metering orifice. The curved slots produced by etching in the disk, with their geometry, i.e., their radial width and curve length, are responsible for the formation of a fuel mist that is broken up into small droplets. The curved slots arranged in groups divide the fuel according to their geometry in the horizontal plane. The individual slot groups must be produced very precisely in relation to one another in order to achieve the breakup of the fuel in the desired manner. The curved slots have a constant opening width over the entire axial extension of the breakup element. Therefore, atomizing can only improved by varying the horizontal geometry in the radial direction of the slots in the plane of the breakup element. The fuel is atomized fully and uniformly due to the slots being arranged in groups.

ADVANTAGES OF THE INVENTION

The fuel injection valve according to the present invention has the advantage over the related art that high-quality and uniform fine atomization of the fuel is achieved without additional power consumption. This is accomplished by the injector plate provided on the fuel injection valve having at least one uninterrupted annular gap so that the swirling fuel to be sprayed forms a continuous annular jet lamella immediately downstream from the annular gap. Due to the geometry of the injector plate and the annular gap, this lamella has the shape of a truncated cone or a bell. Because of its surface tension, the fuel cone becomes thinner in its fuel film thickness in the downstream direction, i.e. with the increasing diameter, until it breaks up into minute droplets. These minute droplets have a reduced Sauter Main Diameter (SMD) compared to the related art, i.e., a smaller mean droplet diameter of the sprayed fuel; an SMD of <60 μm can be achieved. As a result, the exhaust emissions of an internal combustion engine and fuel consumption can be further reduced among other things.

As an additional advantage, the arrangement according to the present invention achieves a uniform distribution of the sprayed fuel on a relatively large surface. This yields a smaller droplet packing density in the fuel spray formed after the broken-up lamellas and good mixture with the air intake stream of the internal combustion engine. In addition, the danger of droplet coagulation, i.e., recombination into larger droplets, is reduced.

The possibility of influencing the lamella angle by changing the axial annular gap height represents an additional advantage of the fuel injection valve according to the present invention. Variation of the annular gap height results, however, in negligible changes in the flow rate, since the stream separates on one side in the annular gap. Therefore the flow rate over the width of the annular gap and the lamella angle over the height of the annular gap can be adjusted separately.

Due to the radial offset of the annular gap of the injector plate in relation to the inlet into the helical depressions provided upstream from the annular gap, an S-shaped flow of the fluid is obtained in the injector plate. This provides the flow with a radial velocity component, which is not lost even at the exit. The flow is given a turbulence conducive to atomization by the "S-collision" with the flow deflectors. The flow is also given an advantageous swirl component in addition to the radial component by the swirl-promoting depressions that do not run in a completely radial direction.

DETAILED DESCRIPTION OF THE INVENTION

Figure 1:
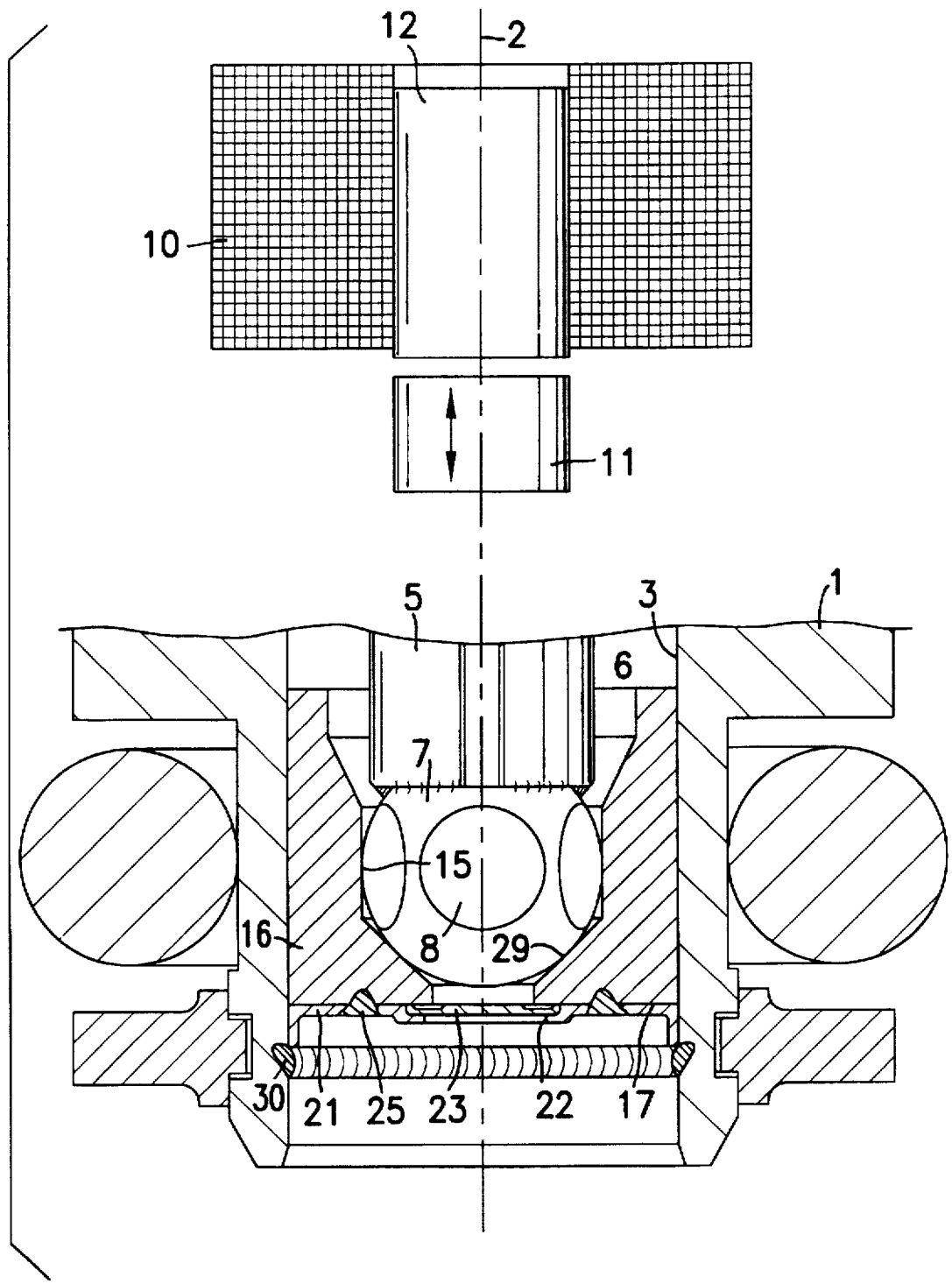
FIG. 1 shows a partial view of a fuel injection valve with an injector plate according to the present invention.

The embodiment illustrated in FIG. 1 is a partial view of a valve in the form of an injection valve for fuel injection systems of mixture-compressing externally ignited internal combustion engines. The injection valve has a tubular valve seat support 1 in which a longitudinal orifice 3 is formed concentrically to a longitudinal valve axis 2. A tubular valve needle 5, connected at its downstream end 6 to an optionally spherical valve closing element 7, provided on its periphery with for example five flats 8, is arranged in longitudinal orifice 3.

The injection valve is actuated in the well-known manner, for example, electromagnetically. An electromagnetic circuit with a magnetic coil 10, an armature 11, and a core 12 are used to axially move valve needle 5, thus closing the valve or opening it against the elastic force of for example a reset spring (not illustrated). Armature 11 is connected to the end facing away from valve closing element 7 of valve needle 5 through a weld produced by laser, for example, and aligned with core 12.

A guide orifice 15 of a valve seat body 16 is used to guide valve closing element 7 during its axial motion. Valve seat body 16, which may be cylindrical, is hermetically welded to the end of valve seat support 1 facing away from core 12 in longitudinal opening 3 that runs concentrically to longitudinal valve axis 2. At its lower end 17, facing away from valve closing element 7, valve seat body 16 is concentrically and permanently attached to a supporting ring 21, which may have a cup-shaped design and is thus in close contact with valve seat body 16. Supporting ring 21 has a shape for example similar to that of the well-known cup-shaped spray hole disk with a central area of supporting ring 21 being provided with a stepped through orifice 22 to accommodate an injector plate 23 according to the invention.

Valve seat body 16 is connected to supporting ring 21, for example, through a hermetical peripheral first weld 25, produced with a laser for example. With this type of assembly, the danger of undesirable deformation of supporting ring 21 in its central area with through orifice 22 and injector plate 23 mounted therein is avoided. Supporting ring 21 is furthermore connected to the wall of longitudinal orifice 3 in valve seat support 1, for example through a peripheral and hermetically closing second weld 30.

The insertion depth of the valve seat part, consisting of valve seat body 16, cup-shaped supporting ring 21 and injector plate 23, into longitudinal orifice 3 determines the length of stroke of valve needle 5, since one end position of valve needle 5 when magnetic coil 10 is not energized is determined by the close contact of valve closing element 7 with a valve seat surface 29 of valve seat body 16. The other end position of valve needle 5, when magnetic coil 10 is energized, is determined, for example, by the close-contact of armature 11 with core 12. The distance between these two end positions of valve needle 5 is therefore the stroke.

Spherical valve closing element 7 works with truncated cone-shaped valve seat surface 29 of valve seat body 16; valve seat surface 29 is formed in the axial direction between guide orifice 15 and lower face 17 of valve seat body 16.

Figure 2:
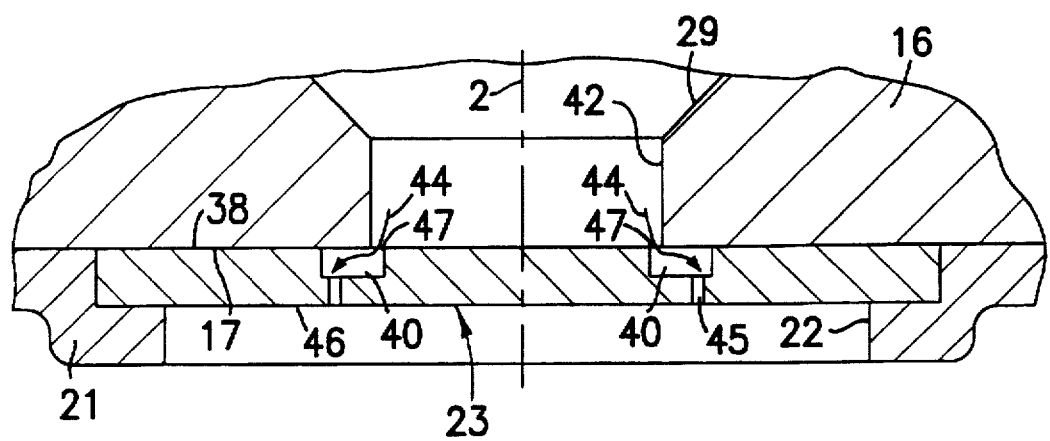
FIG. 2 shows an axial section of a first embodiment of an injector plate according to the present invention.

FIG. 2 shows an axial section of injector plate 23 built into an injection valve. Injector plate 23 is designed as a plane, flat, circular disk. Injector plate 23 is centered in supporting ring 21. Injector plate 23 is fastened to the injection valve and specifically to valve seat body 16 using, for example, clamping, which is possible due to the contour of supporting ring 21. Such a fastening as indirect attachment of injector plate 23 to valve seat body 16 has the advantage that, contrary to processes like welding or soldering, a temperature-related deformation of the fine annular gap geometry is completely avoided. The stepped through orifice 22 in supporting ring 21 is dimensioned so accurately that it can accommodate injector plate 23 very precisely without stresses. Instead of the even outside contour, injector plate 23 can also have an outside contour stepped in the axial direction. Supporting ring 21 does not represent, however, a necessary condition for fastening injector plate 23. Since the fastening options are not relevant to the invention, here we shall only briefly refer to the other well-known bonding processes, such as welding, soldering, or gluing. In the assembled state, an upper face 38 of injector plate 23 is in close contact with lower face 17 of valve seat body 16, as the bottom of cup-shaped supporting ring 21.

Flat injector plate 23 has a plurality of swirl-promoting depressions 40, open from the fuel intake side, i.e., the upper face 38 and serving as swirl-producing elements. Swirl-promoting depressions 40 are evenly distributed around a circle in injector plate 23, with only the general arrangement of the swirl-promoting depressions 40 being circular. Each swirl-promoting depression 40 has a cross section that may be, for example, rectangular. The diameter of the circle on which the swirl-promoting depressions 40 are arranged depends mainly on the width of an outlet orifice 42 in the valve seat body 16, downstream from valve seat surface 29. In order to achieve unimpeded fuel intake in injector plate 23 and especially in the swirl-promoting depressions, swirl-promoting depressions 40 are designed so that their internal areas, located closest to longitudinal valve axis 2, have a smaller effective diameter than the diameter of exit orifice 42. The flow directions are schematically indicated through arrows 44 in FIG. 2. Swirl-promoting depressions 40 are not fully radial, but also have a precisely defined component in the peripheral (circumferential) direction. The design of swirl-promoting depressions 40 is elucidated by the top view of injector plate 23 in FIG. 3. This shows the turbine vane-like arrangement of the mostly radial swirl-promoting depressions 40, which are however tilted in the peripheral direction and run with their longitudinal axes along longitudinal valve axis 2.

Downstream from swirl-promoting depressions 40, a narrow annular gap 45, uninterrupted over its circumference, follows as fuel outlet geometry in injector plate 23. Annular gap 45 runs, for example, with vertical limiting walls, produced cost-effectively using, for example electroforming (MIGA method: Microstructuring, Electroforming, Deforming), which extend to a lower face 46 of injector plate 23. The cross section surface of annular gap 45 determines the flow rate, with the annular gap width being usually in the range between 25 μm and 50 μm. For a diameter of approximately 5 mm, injector plate 23 has a thickness of 0.2 mm to 0.4 mm, with the axial lengths of swirl-promoting depressions 40 and annular depression (gap) 45 being approximately the same (equivalent). These magnitudes for the dimensions of injector plate 23 and all other dimensions given in the description are intended to facilitate comprehension and in no way limit the invention.

In the embodiment shown in FIG. 2, annular gap 45 has a larger diameter than the effective diameter of inlet areas 47 for the fuel in swirl-promoting depressions 40. Inlet areas 47 are understood here as the orifice areas of swirl-promoting depressions 40, where swirl-promoting depressions 40 are not covered by valve seat body 16. The diameter of annular gap 45 is therefore greater than the diameter of outlet orifice 42 in valve seat body 16. Thus there is a radial offset of the inlet and outlet of injector plate 23. An additional offset in the peripheral direction is necessarily obtained from the arrangement of swirl-promoting depressions 40 through their not exactly radial orientation. Annular gap 45 runs downstream from the outer radial area, but only so far out that the fuel can flow from swirl-promoting depressions 40 into annular gap 45 without overlapping. In the swirl-promoting depressions, the fuel has a swirl component acquired through the configuration of swirl-promoting depressions 40 as described above. The swirl component results in the exiting fluid lamella widening, making it possible to obtain a desired jet angle, despite annular gap 45 being perpendicular to injector plate 23.

A jet geometry providing a large surface area in relation to the amount of fuel is the hollow fuel lamella. A large total surface area is equivalent to (achieved by) the breakup of the fuel into as many small droplets as possible. In injector plate 23 according to the present invention, the lamella is formed with as large a diameter as possible when passing through annular gap 45. In the downstream direction, the lamella becomes thinner, which is enhanced by the increase in the lamella's circumference caused by its bell shape. The bell shape is obtained from a low-pressure core in the central hollow space of the lamella. The swirl component contributes to an enlargement of the lamella circumference, which further increases the free jet surface area and makes the lamella break up into smaller drops. Furthermore, the spatial packing density of the droplets decreases for larger lamella cross sections, making droplet coagulation in the fuel spray (recombination of droplets into larger drops) less likely. Lamella breakup starts at a well-defined axial distance from annular gap 45. The lamella surface area becomes more undulated as the distance to injector plate 23 increases due to aerodynamic interactions with the gas surrounding the lamella (Taylor effect). The instability in the lamella increases with increasing distance from annular gap 45 until a point where it suddenly breaks up into minute fuel droplets. The advantage of this arrangement consists of the fact that almost no other disturbances occur aside from lamella undulation.

The jet angle of the exiting lamella can be varied and adjusted by engineering measures. The jet angle can be influenced by the following factors among others:

the shape of swirl-promoting depressions 40 (radial component to peripheral component ratio), ratio of the outer diameter of swirl-promoting depressions 40 to the diameter of annular gap 45, degree of overlap, i.e., size of the overlap of swirl-promoting depressions 40.

Figure 3:
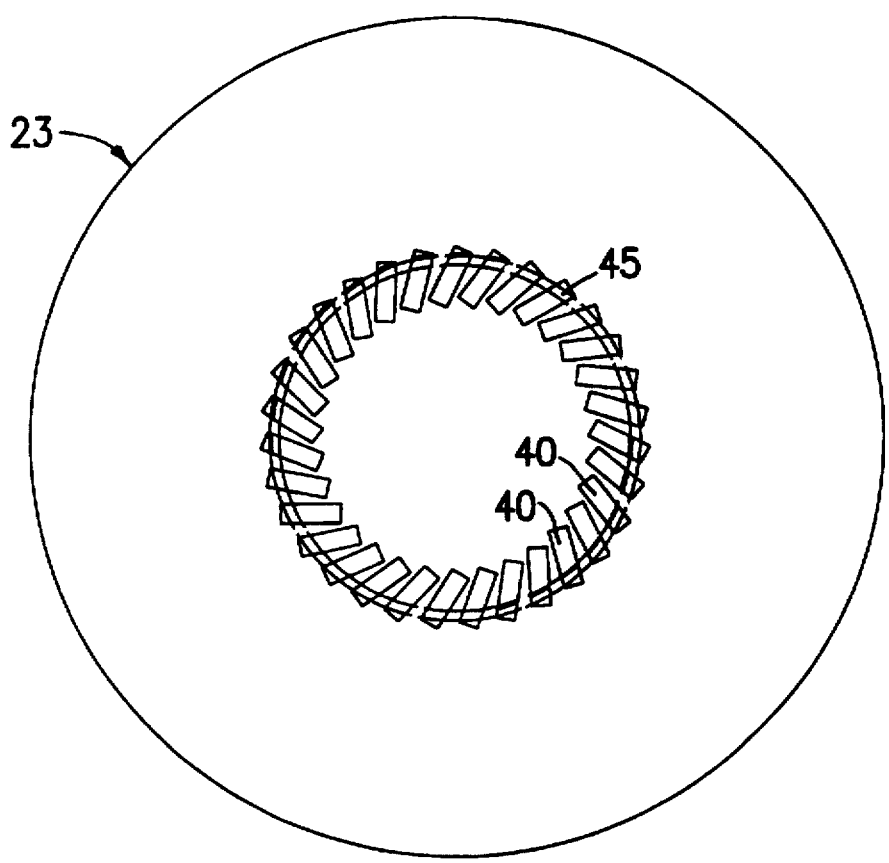
FIG. 3 shows a top view of the injector plate of FIG. 2.
Figure 4:
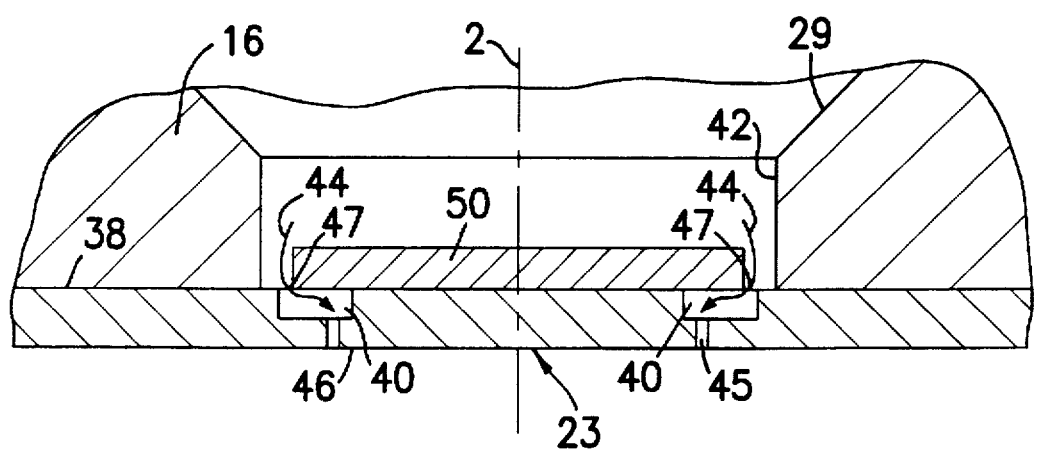
FIG. 4 shows an axial section of a second embodiment of an injector place according to the present invention.

FIG. 4 shows the axial section of a second embodiment of an injector plate 23, which differs from injector plate 23 of FIGS. 2 and 3 only by the fact that the S-shaped flow in injector plate 23 occurs in the reverse direction, since annular gap 45 is designed with a smaller diameter than outlet orifice 42 and thus smaller than inlet areas 47 in swirl-promoting depressions 40. In order to achieve the radial offset of inlet and outlet of injector plate 23, it is recommended that an additional thin, for example circular, cover disk 50 be provided on injector plate 23 on its upper face. This cover disk 50 has such an outer diameter that swirl-promoting depressions 40 are not fully covered on the outside and thus inlet areas 47 have the desired size. Outlet orifice 42 of valve seat body 16, where cover disk 50 is now located, has a larger diameter now than the effective diameter through the outer edge areas of swirl-promoting depressions 40.

Additional examples of embodiment, not illustrated, result from fully omitting a cover of swirl-promoting depressions 40 or by using covers configured differently. Thus it is conceivable to form additional layers similar to cover disk 50 directly on injector plate 23 during its manufacture, which then perform the function of the cover.

A particularly suitable and preferred manufacturing process for injector plate 23 is briefly described below. The process is based on a flat and stable substrate, which may consist, for example, of silicon, glass, or ceramic. The usual thicknesses of these substrate plates are between 0.5 mm and 2 mm. After cleaning the substrate, an auxiliary layer is applied electrically on the substrate. This can be an electrical primer layer, (e.g., Cu), necessary to provide conductance for subsequent electroplating. This auxiliary layer can also serve as a stop layer for the subsequent microstructuring or as a sacrifice layer to make it possible to subsequently decollate injector plates 23 in a simple manner, e.g., by etching. Then a microstructurable layer is applied on the entire auxiliary layer. A thermoplastically deformable plastic (e.g. polymethylmethacrylate PMMA) is especially advantageously applied to the auxiliary layer, particularly by lamination as a film.

Subsequently this layer is structured using a mask. Microstructuring can be performed by diamond machining or ablation using excimer laser, especially due to its high precision. The excimer laser used, for example, for microstructuring, is distinguished by its very high power density and short wavelength (typically $\lambda=193$ nm) After this process, an electroplating mask remains in the PMMA layer. Metal is applied around this mask in an electroplating bath. The metal is applied as a close-fitting layer on the contour of the electroplating mask, so that it accurately reproduces the predefined contours. Ni, NiCo, NiFe, or Cu are normally used for electroplating.

Depending on the desired design of injector plate 23, the microstructuring and electroforming steps can now be repeated. After completing the electroplating processes, the electroplating masks are removed. When PMMA is used for the layers to be structured, ethyl acetate is especially well-suited for removing it. After this removal, injector plate 23 is on the substrate already in its final form. Finally injector plate 23 is decollated. For this purpose, the auxiliary layers are removed by etching and injector plate 23 is lifted off the substrate.

Another, very similar manufacturing principle provides for the manufacture of forming tools according to the MIGA method in the above-described manner, which are exactly the reverse (negative structure) of the desired injector plate 23. This method is especially cost-effective for large quantities of injector plates 23.

These forming tools configured as negatives of injector plates 23 must be machined so precisely as to be usable at least 10,000 times with unchanged quality. To this end UV intaglio lithography is also well-suited for producing injector plate 23. Also in this process, an auxiliary layer (sacrifice layer, electroplating primer layer) is applied, on which a photoresist is laminated, splashed or sprayed. The structure to be produced is than transferred with the help of a photolithographic mask (UV exposure). After developing the UV-exposed photoresist, a structure defined by the mask is obtained in the photoresist, which represents a negative structure of the injector plate 23 layer to be obtained later. The remaining photoresist structure is subsequently electrically filled with metal. The process steps after electroplating, such as removal of the auxiliary layers and decollating injector plate 23 from the substrate take place as in the previously described method.

What is claimed is:

1. A fuel injection valve, comprising:

a valve needle having a longitudinal valve axis;

a valve seat surface disposed downstream of the valve needle;

a valve closing element having at least a first position and a second position, the valve closing element cooperating with the valve seat surface to control a fuel stream flowing through the valve needle; and an injector plate disposed downstream of the valve seat surface, the injector plate having an upstream side and a downstream side and having a plurality of swirl-producing depressions on the upstream side, each of the plurality of swirl-producing depressions having a fuel intake area, the injector plate also having at least one uninterrupted annular gap on the downstream side forming a spray geometry, the plurality of swirl-producing depressions and the annular gap being connected to allow the fuel stream to flow through the injector plate.

2. The device according to claim 1, wherein a width of the annular gap is within a range of 25 µm to 50 µm.

3. The device according to claim 1, wherein at least a portion of the plurality of swirl-producing depressions have a rectangular cross section.

4. The device according to claim 1, wherein the plurality of swirl-producing depressions are arranged in a circular shape on the injector plate and run in a turbine vane-like manner in a top view of the injector plate.

5. The device according to claim 4, wherein the turbine vane-like arrangement of the swirl-producing depressions is obtained by each of the plurality of depressions running substantially in a radial direction and being tilted in a circumferential direction, each of the plurality of swirl-producing depressions being arranged one behind the other in a circular shape.

6. The device according to claim 1, wherein the fuel intake areas are arranged in a circular shape, the circular shape having a diameter less than a diameter of the annular gap, so that a radial offset exists between the fuel intake areas and the annular gap.

7. The device according to claim 1, wherein the injector plate is produced using a microstructuring process in combination with an electroforming process.

8. The device according to claim 7, wherein the microstructuring process includes diamond machining.

9. The device according to claim 7, wherein the microstructuring process includes ablation using an excimer laser.

10. The device according to claim 7, wherein the microstructuring process includes a UV intaglio lithography process.

* * * * *